(12) United States Patent
Woelfle et al.

(10) Patent No.: US 11,926,958 B2
(45) Date of Patent: Mar. 12, 2024

(54) FORMALDEHYDE-FREE BINDER COMPOSITION

(71) Applicant: WACKER CHEMIE AG, Munich (DE)

(72) Inventors: Heimo Woelfle, Traunstein (DE); Florian Bauers, Burghausen (DE); Holger Poths, Burghausen (DE)

(73) Assignee: Wacker Chemie AG, Munich (DE)

( * ) Notice: Subject to any disclaimer, the term of this patent is extended or adjusted under 35 U.S.C. 154(b) by 308 days.

(21) Appl. No.: 17/047,995

(22) PCT Filed: Feb. 5, 2019

(86) PCT No.: PCT/EP2019/052740
§ 371 (c)(1),
(2) Date: Oct. 15, 2020

(87) PCT Pub. No.: WO2020/160754
PCT Pub. Date: Aug. 13, 2020

(65) Prior Publication Data
US 2021/0355629 A1    Nov. 18, 2021

(51) Int. Cl.
| | | |
|---|---|---|
| *D06M 15/333* | (2006.01) |
| *C09J 131/04* | (2006.01) |
| *D06M 15/227* | (2006.01) |
| *D06M 15/263* | (2006.01) |
| *D06M 15/37* | (2006.01) |
| *D06M 15/71* | (2006.01) |

(52) U.S. Cl.
CPC ......... *D06M 15/333* (2013.01); *C09J 131/04* (2013.01); *D06M 15/227* (2013.01); *D06M 15/263* (2013.01); *D06M 15/37* (2013.01); *D06M 15/71* (2013.01)

(58) Field of Classification Search
CPC ... C09D 131/04; C09J 131/04; D06M 15/333; D06M 15/227; D06M 15/263
See application file for complete search history.

(56) References Cited

U.S. PATENT DOCUMENTS

| | | | |
|---|---|---|---|
| 4,332,850 A | 6/1982 | Iacoviello | |
| 5,087,487 A * | 2/1992 | Katz ............... | D06M 15/327 427/389.9 |
| 9,340,908 B2 | 5/2016 | Boylan et al. | |
| 2013/0149929 A1 | 6/2013 | Boylan et al. | |
| 2017/0253759 A1 | 9/2017 | Künstle et al. | |
| 2019/0127916 A1 | 5/2019 | Boylan et al. | |

FOREIGN PATENT DOCUMENTS

| | | |
|---|---|---|
| CN | 106536663 B | 3/2017 |
| EP | 0184153 B1 | 7/1991 |
| EP | 0609849 A1 | 8/1994 |
| EP | 0596318 B1 | 9/1998 |
| JP | 2008297523 A | 12/2008 |
| WO | 2013085764 A1 | 6/2013 |
| WO | 13124417 A1 | 8/2013 |
| WO | 2017189350 A1 | 11/2017 |

* cited by examiner

Primary Examiner — Mary Lynn F Theisen
(74) Attorney, Agent, or Firm — BROOKS KUSHMAN P.C.

(57) ABSTRACT

Textile nonwovens are produced without formaldehyde by employing a polymer binder which is a copolymer of vinyl acetate, ethylene, (meth)acrylamide, (meth)acrylic acid and maleic acid or anhydride or maleamic acid.

20 Claims, No Drawings

FORMALDEHYDE-FREE BINDER COMPOSITION

CROSS REFERENCE TO RELATED APPLICATIONS

This application is the U.S. National Phase of PCT Appln. No. PCT/EP2019/052740 filed Feb. 5, 2019, the disclosure of which is incorporated in its entirety by reference herein.

BACKGROUND OF THE INVENTION

1. Field of the Invention

The invention relates to a formaldehyde-free binder composition and to the use thereof for producing textile sheet-like structures.

2. Description of the Related Art

Binder compositions for textile sheet-like structures generally comprise polymers based on ethylenically unsaturated monomers as a binder component and in most cases are present as an aqueous dispersion. The polymers typically comprise units of crosslinking monomers and can therefore crosslink with one another and if applicable also with fibers and thus contribute to the formation of textile sheet-like structures with higher strength. As a result, permanent fixing of the fibers and an increase in the durability of the textile sheet-like structures with respect to mechanical stress can be achieved. Textile sheet-like structures are also known under the term "nonwovens" and can be produced, for example, by the air-lay, wet-lay or spun-lay processes.

In industrial practice, predominantly polymers, comprising N-methylolacrylamide units (NMA), have so far prevailed as a binder component. N-Methylolacrylamide groups can react with the OH groups of cellulose or starch and consequently result in covalent bonds between binder polymer and fiber.

Disadvantageously, formaldehyde is formed in the course of crosslinking such polymers, which is to be avoided for toxicological reasons. In addition, as a result of their manufacture, such polymers in many cases already comprise formaldehyde as an accompanying substance, for example in manufacture by means of polymerization using formaldehyde-releasing initiators such as sodium formaldehyde sulfoxylate.

There is therefore the need to minimize the formaldehyde content in binder compositions and as far as possible to render formaldehyde-free textile sheet-like structures accessible in an efficient manner.

In EP 0 596 318 B1, for reducing the formaldehyde in an aqueous polymer dispersion during polymerization, ascorbic acid is used as a reducing agent in the redox initiator system instead of sodium formaldehyde sulfoxylate. WO 2013/124417 A1 describes an NMA-containing nonwoven binder in which the N-methylolacrylamide monomer units have been replaced in part by acrylamide monomer units. Known from WO 2017/189350 A1 is the use of vinyl acetate-ethylene copolymers stabilized with polyvinyl alcohol, with a combination of N-methylolacrylamide and acrylamide comonomer units. WO 2013/085764 A1 describes a fiber binder based on a vinyl acetate-ethylene copolymer dispersion stabilized with polyvinyl alcohol, which does not comprise any N-methylolacrylamide, and which comprises ammonium chloride for improving the wet strength of the binder. EP 0 609 849 A1 describes a nonwoven binder in the form of an aqueous, emulsifier-stabilized dispersion of a vinyl acetate-ethylene copolymer with N-butoxymethylacrylamide and acrylamide monomer units. EP 0 184 153 B1 describes formaldehyde-free latex binders, stabilized with anionic emulsifier, based on acrylic ester copolymers with acrylamide and dicarboxylic acid monomer units. JP 2008-297523 A describes adhesives based on vinyl acetate-ethylene copolymers stabilized with polyvinyl alcohol, which also comprise comonomer units derived from acrylamide and acrylic acid.

The problem addressed by the invention is to provide an aqueous binder for fiber bonding which, even without addition of crosslinking catalyst, results in a high wet strength of the fiber composite without releasing formaldehyde.

SUMMARY OF THE INVENTION

The invention relates to an aqueous binder composition for fiber bonding, obtainable by free-radically initiated polymerization of vinyl acetate and ethylene, in the presence of polyvinyl alcohol in aqueous medium, characterized in that a) 60 to 94% by weight vinyl acetate,
b) 5 to 30% by weight ethylene,
c) 0.4 to 5% by weight acrylamide and/or methacrylamide,
d) 0.4 to 5% by weight acrylic acid and/or methacrylic acid,
e) 0.2 to 2% by weight maleic anhydride and/or maleic acid, are copolymerized in the presence of a polyvinyl alcohol having a degree of hydrolysis of 80 to 99 mol %, wherein the figures in % by weight refer in each case to the total weight of the comonomers and in each case add up to 100% by weight.

DETAILED DESCRIPTION OF THE PREFERRED EMBODIMENTS

Preferably, a) 70 to 85% by weight vinyl acetate, based on the total weight of the comonomers, is copolymerized.

Preferably, b) 15 to 28% by weight ethylene, based on the total weight of the comonomers, is copolymerized.

Preferably, c) 0.5 to 2% by weight, more preferably 0.7 to 1.2% by weight acrylamide and/or methacrylamide, based in each case on the total weight of the comonomers, is copolymerized. Preferably, only acrylamide is copolymerized as comonomer c).

Preferably, d) 0.5 to 2% by weight, more preferably 0.7 to 1.2% by weight acrylic acid and/or methacrylic acid, based in each case on the total weight of the comonomers, is copolymerized. Preferably only acrylic acid is copolymerized as comonomer d).

Preferably, e) 0.2 to 1% by weight, more preferably 0.4 to 0.6% by weight maleic anhydride and/or maleic acid, based in each case on the total weight of the comonomers, is copolymerized. Preferably, only maleic anhydride is copolymerized as comonomer e).

In a further preferred embodiment, the monomers c) and e) can be wholly or partly replaced with maleamic acid.

Most preferably, the ratios by weight of comonomer fraction c): comonomer fraction d): comonomer fraction e) are approximately 1:1:(0.5 to 1).

The polymers are obtainable by free-radically initiated polymerization. The polymers can be produced in a manner known per se, for example by the suspension polymerization process or preferably by the emulsion polymerization process in water. The polymerization temperature is generally 20° C. to 120° C. and it is operated under pressure, generally between 5 bar and 100 bar. Initiation of the polymerization can be effected with water-soluble or monomer-soluble initiators or redox initiator combinations commonly used for emulsion polymerization or suspension polymerization. Preferred reducing agents are ascorbic acid, isoascorbic acid or the salts thereof or formaldehyde-free reducing agents such as Brüggolite FF6. Preferred oxidizing agents are persulfate compounds and peroxide compounds, especially ammonium or alkali metal persulfates or hydrogen peroxide. Preferably, no formaldehyde-releasing substances such as formaldehyde sulfoxylates are used as initiators.

The polymerization preferably takes place in the presence of preferably 1 to 10% by weight, based on the total weight of the comonomers, of one or more polyvinyl alcohols having a degree of hydrolysis in each case of 80 to 99 mol %, preferably 85 to 90 mol %, more preferably 87 to 89 mol %. The Höppler viscosity in 4% aqueous solution of the polyvinyl alcohols is generally 2 to 40 mPas, preferably 2 to 15 mPas (method according to Höppler at 20° C., DIN 53015). The polyvinyl alcohols mentioned are commercially available and accessible by methods known to those skilled in the art.

Optionally, small amounts of emulsifiers can additionally be used in the polymerization, for example 0.1 to 2.0% by weight, based on the total weight of the comonomers. Preferably, no emulsifiers are used during the polymerization. The aqueous dispersions generally have a solids content of 40 to 60% by weight and preferably 45 to 55% by weight. The Brookfield viscosity of the aqueous dispersions is preferably 50 to 2000 mPas, more preferably 100 to 1500 mPas (determined using a Brookfield viscometer at 23° C. at 20 rpm at a solids content of the dispersions of 49 to 51% by weight).

The binder compositions may also comprise one or more additives, for example emulsifiers such as fatty alcohol ethoxylates with low degrees of ethoxylation, particularly 2 to 5, or diisotridecyl sulfosuccinate or the salts thereof such as sodium salts. Typical amounts of emulsifiers used, based on the dry weight of the polymer, are 0 to 1% by weight, preferably 0 to 0.6% by weight. The hydrophilicity of the textile sheet-like structures finished with such binder compositions can be increased with emulsifiers. Further additives are acidic catalysts such as ammonium chloride, citric acid or sulfuric acid. Acidic catalysts are typically added in amounts of 0 to 2% by weight, preferably 0.1 to 1% by weight, based on the dry weight of the polymer. If the acidic catalysts are Brönstedt acids, as much of these is used so that a pH of preferably 0 to 4 and more preferably of 2 to 3 results. Most preferably, no catalysts are used in the aqueous binder composition.

The process for producing textile sheet-like structures is generally effected by bringing fibers into contact with one or more aqueous binder compositions according to the invention and subsequently drying. The drying is preferably effected at temperatures of 160° C., more preferably 120 to 160° C. and most preferably at 140 to 160° C.

The fibers are based in general on natural or synthetic, especially organic, materials. Examples of these are synthetic fibers based on fiber-forming polymers such as viscose, polyester, polyamide, polypropylene and polyethylene fibers. Examples of natural fiber materials are wood, wool, cotton, jute, flax, hemp, coconut, ramie and sisal fibers and especially cellulose fibers. The fibers can be used loose or also in the form of bundles or woven textiles, yarns or preferably in the form of nonwovens such as fleeces, scrims or knitted fabrics. The nonwovens can optionally be thermally or mechanically pre-compacted, for example needled.

The fibers can have any lengths, preferably 5 mm to 100 mm, particularly preferably 7 mm to 75 mm and most preferably 10 mm to 60 mm. The fibers can have the customary diameters, preferably diameters of 0.1 µm to 1 mm, more preferably 0.5 µm to 100 µm and most preferably 1 µm to 50 µm.

To produce the textile sheet-like structures in a manner according to the invention, the aqueous binder composition is preferably used in an amount of 1 to 50% by weight, more preferably 10 to 30% by weight and most preferably 15 to 25% by weight, based in each case on the total weight of the fibers. The proportion of the fibers is preferably 40 to 99% by weight, more preferably 60 to 90% by weight and most preferably 70 to 80% by weight, based in each case on the total weight of the textile sheet-like structures.

To produce the textile sheet-like structures in a manner according to the invention, this can be done in such a way that, prior to the compaction, the fibers are stretched out over a large area. The processes for this are known and primarily depend on the application for which the compacted fiber material is intended. The fibers can be laid out for example by means of an air laying, wet laying, direct spinning or carding device. If appropriate, mechanical compaction can also be carried out, for example by cross-laying, needling or water jet compacting, before compaction with the binder. Subsequently, the binder composition can be applied to the laid-out fibers, wherein the binder compositions can be applied as a sheet, or in dotted or patterned form. Subsequently, the fibers may be bonded by applying heat and optionally pressure.

The aqueous binder composition is also suitable for producing laminates, in which case two fiber layers are adhered to each other, or one fiber layer is adhered to a further substrate. This may be done by laying out a fiber layer and applying the binder composition after laying out, and laying a further fiber layer on top, for example by air-laying. Instead of the two fiber layers, another substrate, for example a plastic film, can also be laid on top. This is followed by binding by applying heat and optionally pressure. This procedure makes accessible, for example, reclaimed cotton insulating materials durably clad with a fiber web as surfacing material.

The binder compositions are also suitable for the manufacture of lofty nonwovens or waddings as used, for example, as semi-finished products for the production of moldings from fibrous materials or as padding, cushioning, insulating and filter waddings. To this end, the binder compositions can be applied to the fibers and compacted by heating, preferably in a mold.

The textile sheet-like structures produced according to the invention are preferably nonwovens, in particular tissues, felts, waddings or coarse-mesh, loose wovens or knits. The textile sheet-like structures may, for example, be used in the automotive sector, for household products such as tablecloths, hygiene articles such as toilet paper, in the clothing industry, for medical textiles or geotextiles.

The following examples serve to further elucidate the invention:

Binder Composition:

For testing, aqueous dispersions of vinyl acetate-ethylene copolymer dispersions having a solids content of ca. 55% were produced.

The production was carried out by emulsion polymerization of 76 to 78% by weight vinyl acetate, 21 to 22% by weight ethylene and the amounts specified in Table 1 of acrylamide (AAM), acrylic acid (AA), maleic anhydride (MA), maleamic acid (MAA) and N-methylolacrylamide (NMA).

The polymerization was in each case carried out in a pressure reactor in a temperature interval of 40 to 75° C. and at a pressure of up to 85 bar.

The polymerization was carried out in the presence of 10% by weight, based on the total weight of the comonomers, of a polyvinyl alcohol (PVOH) having a Höppler viscosity of 5 mPas (4% aqueous solution) and a degree of hydrolysis of 88 mol %. Hydrogen peroxide and Brüggolith FF6 were used for the initiation.

TABLE 1

| Example | AAM (%) | AA (%) | MA (%) | NMA (%) | MAA (%) | Stabilization |
|---|---|---|---|---|---|---|
| Ex. 1 | 1 | 1 | 0.5 | 0 | 0 | PVOH |
| CE. 2 | 0 | 0 | 0 | 0 | 0 | PVOH |
| CE. 3 | 0 | 0 | 0.5 | 0 | 0 | PVOH |
| CE. 4 | 1 | 1 | 0 | 0 | 0 | PVOH |
| CE. 5 | 0 | 0 | 0 | 1 | 0 | PVOH |
| Ex. 6 | 0 | 1 | 0 | 0 | 1 | PVOH |
| CE. 7 | 1 | 1 | 0 | 0 | 0 | Emulsifier |
| CE. 8 | 1 | 1 | 0.5 | 0 | 0 | Emulsifier |

Determination of the wet strength value for air-laid nonwovens: the polymer dispersion of the respective (comparative) example, diluted with water to a solids content of 20%, was homogeneously sprayed onto both sides of a thermally pre-bonded air-laid web (75 g/m²; 88% fluff pulp and 12% PP/PE two-component fibers; 0.85 mm thickness) by means of applying a sprayable liquor using a semiautomatic spraying assembly in accordance with the airless process (Unijet 8001 E slot nozzles; 5 bar), and then dried in a laboratory through-air dryer (Mathis LTF; from Mathis/CH) at 160° C. for 3 min (application amount: 20% by weight polymer, based on the total weight of polymer and web).

For each breaking strength test, 10 web strips (20 cm clamped length; 5 cm clamped length) were prepared in the cross direction to the machine production direction. To measure the wet breaking strengths, the sample strips were each stored in water for 1 min prior to measurement.

The wet breaking strengths were determined in analogy to DIN EN 29073 (Section 3: test methods for nonwovens, 1992) and the test samples subjected to an ultimate tensile force measurement on a Zwick® 1445 test machine (100 N measurement cell) using TestXpert® Software Version 11.02 (Zwick Roell) at a clamped length of 100±1 mm, a clamped width of 15±1 mm and at a deformation rate of 150 ram/min.

The test results are summarized in Table 2.

TABLE 2

| Example | AAM (%) | AA (%) | MA (%) | NMA (%) | MAA (%) | Wet strength (N/5 cm) * |
|---|---|---|---|---|---|---|
| Ex. 1 | 1 | 1 | 0.5 | 0 | 0 | 1170/1120 |
| CE. 2 | 0 | 0 | 0 | 0 | 0 | 361/— |
| CE. 3 | 0 | 0 | 0.5 | 0 | 0 | 861/— |
| CE. 4 | 1 | 1 | 0 | 0 | 0 | 556/609 |
| CE. 5 | 0 | 0 | 0 | 1 | 0 | 1020/1570 |
| Ex. 6 | 0 | 1 | 0 | 0 | 1 | 1158/1249 |
| CE. 7 | 1 | 1 | 0 | 0 | 0 | 149/— |
| CE. 8 | 1 | 1 | 0.5 | 0 | 0 | 383/415 |

* = without catalyst/with 1% citric acid,
— = not measured

Example 1 shows that high wet breaking strengths even without added catalyst are obtained with the binder composition according to the invention. This also applies to the embodiment of Example 6, in which acrylamide and maleic anhydride were substituted with maleamic acid.

In NMA-containing binder compositions, as in comparative example 5, similarly high values are only obtained with acidic catalyst, whereas without catalyst the wet breaking strength is insufficient.

In contrast to the binder composition stabilized with polyvinyl alcohol in Example 1, only insufficient values were obtained with the emulsifier-stabilized binder composition of comparative example 7 and 8.

The invention claimed is:

1. An aqueous binder composition for fiber bonding, obtained by free-radical initiated polymerization of vinyl acetate and ethylene, in the presence of polyvinyl alcohol in aqueous medium, prepared by a process comprising:
    polymerizing
    a) 60 to 94% by weight vinyl acetate,
    b) 5 to 30% by weight ethylene,
    c) 0.4 to 5% by weight acrylamide and/or methacrylamide,
    d) 0.4 to 5% by weight acrylic acid and/or methacrylic acid,
    e) 0.2 to 2% by weight maleic anhydride and/or maleic acid,
    in the presence of a polyvinyl alcohol having a degree of hydrolysis of 80 to 99 mol %,
    wherein the figures in % by weight are relative to the total weight of the comonomers and total 100% by weight, and wherein no N-methylolacrylamide monomer is copolymerized.

2. The aqueous binder composition of claim 1, wherein a) 70 to 85% by weight vinyl acetate, based on the total weight of the comonomers, is copolymerized.

3. The aqueous binder composition of claim 1, wherein b) 15 to 28% by weight ethylene, based on the total weight of the comonomers, is copolymerized.

4. The aqueous binder composition of claim 2, wherein b) 15 to 28% by weight ethylene, based on the total weight of the comonomers, is copolymerized.

5. The aqueous binder composition of claim 1, wherein c) 0.5 to 2% by weight acrylamide, based on the total weight of the comonomers, is copolymerized.

6. The aqueous binder composition of claim 2, wherein c) 0.5 to 2% by weight acrylamide, based on the total weight of the comonomers, is copolymerized.

7. The aqueous binder composition of claim 3, wherein c) 0.5 to 2% by weight acrylamide, based on the total weight of the comonomers, is copolymerized.

8. The aqueous binder composition of claim 1, wherein d) 0.5 to 2% by weight acrylic acid, based on the total weight of the comonomers, are copolymerized.

9. The aqueous binder composition of claim 1, wherein e) 0.2 to 1% by weight maleic anhydride, based on the total weight of the comonomers, is copolymerized.

10. The aqueous binder composition of claim 1, wherein the ratios by weight of comonomer fraction c): comonomer fraction d): comonomer fraction e) are about 1:1:0.5 to 1.

11. The aqueous binder composition of claim 1, further comprising maleamic acid.

12. The aqueous binder composition of claim 1, wherein said composition is copolymerized in the presence of one or more polyvinyl alcohols having a degree of hydrolysis of 80 to 99 mol % and a Höppler viscosity in 4% aqueous solution of 2 to 15 mPas Höppler method at 20° C., DIN 53015.

13. A process for producing textile sheet structures, comprising binding fibers of the textile sheet structures by an aqueous binder composition of claim 1.

14. The process of claim 13, wherein fibers are brought into contact with the aqueous binder composition and are subsequently dried.

15. The process of claim 13, wherein no catalysts are present in the aqueous binder composition.

16. An aqueous binder composition for fiber bonding, obtained by free-radical initiated polymerization of vinyl acetate and ethylene, in the presence of polyvinyl alcohol in aqueous medium, prepared by a process comprising:
   polymerizing
   a) 60 to 94% by weight vinyl acetate,
   b) 5 to 30% by weight ethylene,
   c) maleamic acid,
   d) 0.4 to 5% by weight acrylic acid and/or methacrylic acid,
   in the presence of a polyvinyl alcohol having a degree of hydrolysis of 80 to 99 mol %,
   wherein the figures in % by weight are relative to the total weight of the comonomers and total 100% by weight, and wherein no N-methylolacrylamide comonomers are polymerized.

17. The aqueous binder composition of claim 16, further comprising up to 5 weight percent acrylamide and/or methacrylamide and/or up to 2 weight percent maleic acid and/or maleic anhydride.

18. The aqueous binder composition of claim 1, wherein no acid curing catalyst is present.

19. The aqueous binder composition of claim 16, wherein no acid curing catalyst is present.

20. The process of claim 19, wherein no catalysts are present in the aqueous binder composition.

* * * * *